(12) United States Patent
Deych

(10) Patent No.: US 7,161,155 B1
(45) Date of Patent: Jan. 9, 2007

(54) X-RAY DETECTOR WITH INCREASED DETECTIVE QUANTUM EFFICIENCY

(75) Inventor: Ruvin Deych, Bookline, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 10/876,069

(22) Filed: Jun. 24, 2004

Related U.S. Application Data

(60) Provisional application No. 60/484,390, filed on Jul. 2, 2003.

(51) Int. Cl.
*G01T 1/20* (2006.01)
(52) U.S. Cl. ............................ 250/370.11
(58) Field of Classification Search ............ 250/370.11
See application file for complete search history.

(56) References Cited

U.S. PATENT DOCUMENTS

| | | | |
|---|---|---|---|
| 4,870,667 A * | 9/1989 | Brunnett et al. ............... 378/19 |
| 5,187,380 A * | 2/1993 | Michon et al. ............. 257/428 |
| 6,452,186 B1 * | 9/2002 | Wieczorek et al. .... 250/370.11 |
| 6,521,886 B1 | 2/2003 | Aufrichtig et al. ....... 250/252.1 |
| 6,759,658 B1 * | 7/2004 | Overdick et al. ......... 250/336.1 |
| 6,784,512 B1 | 8/2004 | Yamaguchi et al. ........ 257/440 |

* cited by examiner

*Primary Examiner*—David Porta
*Assistant Examiner*—Marcus Taningco
(74) *Attorney, Agent, or Firm*—McDermott Will & Emery, LLP

(57) ABSTRACT

An x-ray detector having an increased DQE (detective quantum efficiency) is provided. The x-ray detector includes a scintillator for converting incident x-ray photons into optical photons, and an epitaxial p-i-n photodiode for converting these optical photons into an electric signal. The epitaxial photodiode includes a low resistivity $N^+$ type silicon substrate; a high-resistivity, N-type epitaxial layer that forms the intrinsic region of the photodiode; and a light-receiving $P^+$ type layer. The resistivity of the $N^+$ layer is sufficiently low, so that the diffusion lengths of the charge carriers that are formed in the $N^+$ layer by direct conversion of x-rays are small enough to allow these charge carriers to recombine before reaching the pn junction. The resistivity of the epitaxial N-layer is high enough so that the collection efficiency of the output signal resulting from the electron-hole pairs created through absorption of the optical photons in the depletion region is not impaired.

19 Claims, 3 Drawing Sheets

Table 1. DQE for scintillator/photodiode detector for 1.5 MeV x-ray photons.

| Scintillator Crystal thickness (mm) | Quantum Absorption $A_Q$ | (conventional) 0.145 mm Si p-i-n diode | | (epitaxial photodiode) 0.005 mm Si p-i-n diode | |
|---|---|---|---|---|---|
| | | Swank Factor $A_S$ | DQE | Swank Factor $A_S$ | DQE |
| 2.4 | 0.123 | 0.223 | 0.028 | 0.836 | 0.103 |
| 5.0 | 0.240 | 0.330 | 0.080 | 0.919 | 0.221 |
| 10.0 | 0.422 | 0.502 | 0.212 | 0.963 | 0.407 |
| 15.0 | 0.561 | 0.624 | 0.35 | 0.978 | 0.549 |
| 20.0 | 0.666 | 0.717 | 0.479 | 0.986 | 0.657 |

FIG. 3

X-RAY DETECTOR WITH INCREASED DETECTIVE QUANTUM EFFICIENCY

CROSS REFERENCES TO RELATED APPLICATIONS

This application claims the benefit of priority under 35 U.S.C. §119(e) from co-pending, commonly owned U.S. provisional patent application Ser. No. 60/484,390, entitled "X-Ray Detector With Improved Quantum Efficiency," and filed on Jul. 2, 2003.

FIELD OF THE INVENTION

The present invention relates to x-ray detectors.

BACKGROUND

X-ray imaging detectors that operate in a wide range of energies are useful in a large number of applications. High energy x-rays are used for x-ray imaging in radiation therapy treatments, and for security cargo inspections. In these applications, linac-generated MeV x-rays are used. In the keV x-ray range, x-ray detectors are used for medical x-ray CT imaging, security imaging, and non-destructive testing, by way of example.

In all of these applications, and in particular for high energy applications, it is desirable to increase the DQE (detective quantum efficiency) of the x-ray detectors. The DQE can be understood as the ratio of the amount of information contained in the incident x-ray flux to the amount of information in the output signal. The later is always reduced due to the imperfections of the detector, including electronic noise, nonuniformity of the output, nonlinearity, etc.

A modern x-ray computed tomography detector is usually composed of a pixilated scintillator array to convert x-ray energy into light, and a photosensor, such as a semiconductor photodiode array, to convert the light into an electrical signal. Similar detector arrays can be used in radiation treatment imaging for the tumor localization and dose verification, as well as in security x-ray imaging applications.

These x-ray detectors typically include in their output signals parasitic contributions from electron-hole pairs created by direct conversion of x-rays that penetrate the scintillator without interacting with the scintillator material. Such direct conversion of x-rays into electric charge carriers in the photodiode result in output signal contributions that negatively affect the DQE of the x-ray detectors.

Accordingly, it is desirable to provide an x-ray detector having an improved DQE, by substantially reducing such parasitic contributions to the detector output signal.

SUMMARY

An x-ray detector with an increased DQE (detective quantum efficiency) is provided. The x-ray detector includes at least one scintillator for converting incident x-ray photons into optical photons, and at least one p-i-n epitaxial photodiode coupled to the scintillator for detecting optical photons and converting the detected optical photons into an electric signal. By implementing an epitaxial photodiode, which has a high responsivity to light, but a low responsivity to x-rays, parasitic components in the detector output signal caused by direct conversion of x-rays can be substantially reduced, thereby increasing the DQE of the x-ray detector.

The epitaxial photodiode includes: 1) a negatively doped $N^+$ type semiconductor substrate characterized by a relatively low resistivity; 2) an N-type epitaxial layer of a semiconducting material having a relatively high resistivity; and 3) a positively doped $P^+$ type layer for receiving optical photons. The N-type layer is epitaxially grown on an upper surface of the $N^+$ semiconductor substrate. The N-type epitaxial layer forms the bulk intrinsic region of the p-i-n diode. The $P^+$ layer is adjacent to the epitaxial N-layer, forming a pn junction therebetween.

Incident optical photons from the scintillator are absorbed in a depletion region spanning the pn junction. As a result of the absorption of light photons, electron-hole pairs are generated in the depletion region. The resistivity of the epitaxial layer, and the carrier lifetimes in the epitaxial layer, are sufficiently high, so that the collection efficiency of the output signal resulting from the electron-hole pairs created by the absorption of the optical photons in the depletion region is not impaired.

When some of the incident x-ray photons pass through the scintillator to reach the $N^+$ substrate without interacting with the scintillator material, those x-rays directly convert into electron-hole charge carriers. The $N^+$ substrate has a resistivity that is sufficiently low so that the lifetimes and diffusion lengths of the charge carriers are small enough to allow them to recombine before reaching the pn junction. By recombining, the electron-hole pairs generated by direct conversion of the x-rays do not contribute to the collected electric signal from the x-ray detector. In this way, the contribution of x-ray generated charge carriers to the x-ray detector output signal is substantially reduced.

A method is presented for increasing the DQE of an x-ray detector having a scintillator for converting incident x-rays into light, and a semiconductor photodiode for converting light from the scintillator into an electric signal. The method includes fabricating an $N^+$ type silicon substrate by heavily doping a silicon substrate with a negative dopant, so as to obtain an $N^+$ type silicon substrate having a relatively low resistivity. An N-type epitaxial layer, characterized by a relatively high resistivity, is epitaxially grown on an upper surface of the $N^+$ silicon substrate, forming the bulk intrinsic region of the photodiode. A positively doped $P^+$ region is fabricated adjacent the epitaxial layer, thereby forming a pn junction between the $P^+$ region and the epitaxial layer. The DQE of the x-ray detector is increased, by substantially reducing the contribution to the detector output signal from the charge carriers created by direct x-ray conversion.

BRIEF DESCRIPTION OF THE DRAWINGS

FIG. 3 shows a table (Table 1) that schematically illustrates the improvement in DQE of scintillator/photodiode detector for 1.5 MeV x-ray photons, when epitaxial photodiodes are used having epitaxially grown N-layer on a low resistivity semiconductor substrate.

DETAILED DESCRIPTION

Figure 1:
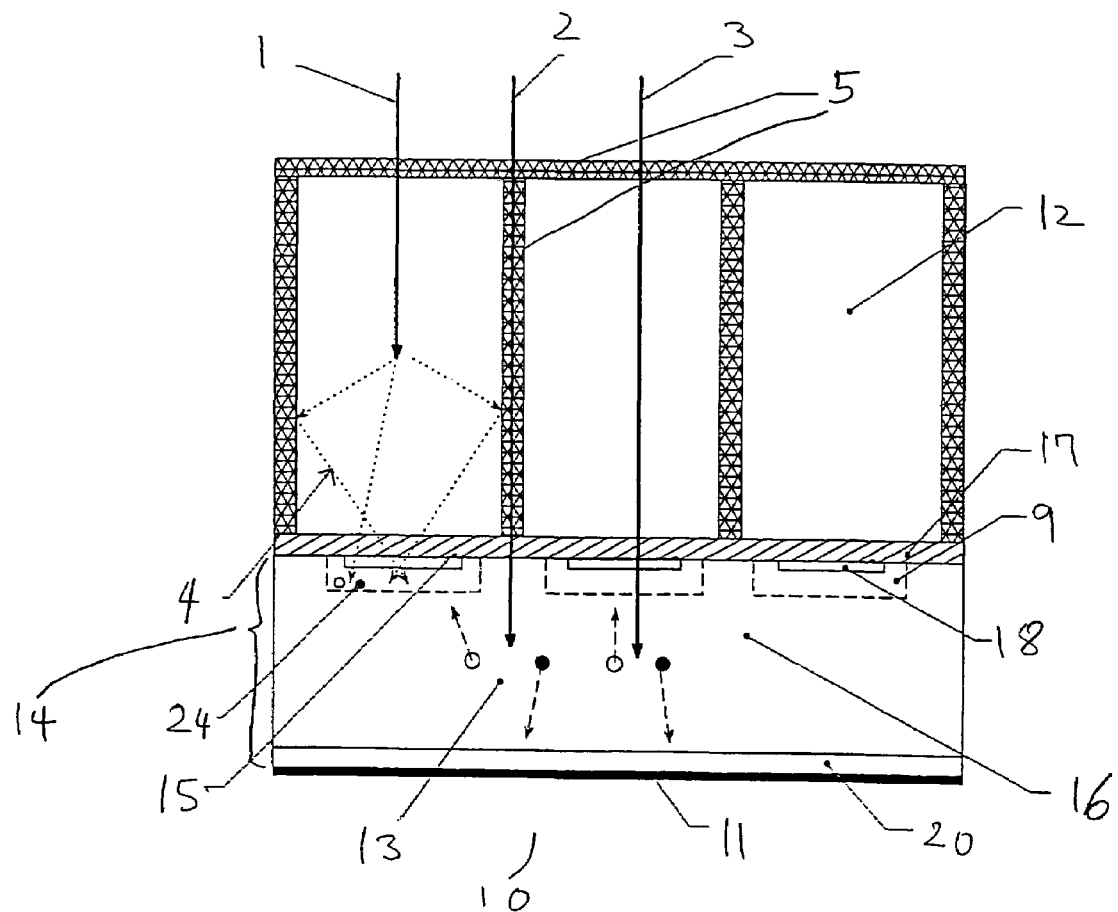
FIG. 1 schematically illustrates a conventional x-ray detector that is known in the art and that does not include an N-layer epitaxially grown on a surface of a low resistivity semiconductor substrate.

FIG. 1 schematically illustrates a conventional x-ray detector 10, known in the art. The x-ray detector 10 may, for example, be an imaging x-ray detector for CT machines. The conventional x-ray detector 10 includes a scintillator 12 and a semiconductor photodiode 14 (typically made of silicon). Incident x-ray photons (indicated in FIG. 1 with reference numeral 1) normally interact with the scintillator 12, and create luminescence photons 4, which in turn are absorbed in a thin top layer of the silicon photodiode 14. Photodiodes make use of the photovoltaic effect, i.e. the generation of a voltage across a semiconductor pn junction, when the junction is exposed to light (i.e. incident photons). The photodiode 14 is preferably a p-i-n photodiode, i.e. a pn junction with an intrinsic region in between. In particular, the photodiode 14 has a bulk intrinsic region 16 sandwiched between a positively doped P$^+$ type semiconducting layer 18 and a negatively-doped N$^+$ type semiconducting layer 20. The p-i-n silicon photodiode in a conventional CT x-ray detector is usually made out of a high resistivity silicon wafer, between about 250 μm to 500 μm thick, and is manufactured using planar technology. An optical interface 17 is provided for bonding the photodiode 14 to the scintillator crystal 12. An optical reflector 5 may be provided in order to fill interchannel gaps in the detector 10.

In the conventional x-ray detector 10, the bulk intrinsic region 16 is made of a very lightly doped or substantially neutrally doped N-type silicon, and forms a major part of the photodiode 14. The P$^+$ active area 18 of the photodiode is usually less than 1 μm thick. The N$^+$ type layer 20 of the diode 14 is covered by a cathode metallization 11. An anode contact 15 is attached to the P$^+$ layer 18. Both the P$^+$ and the N$^+$ type regions 18 and 20 are formed by thermal diffusion or ion implantation. As known in the art, the N$^+$ layer 18 is doped with a negative dopant (donor) to produce an excess of electrons, whereas the P$^+$ layer is doped with a positive dopant (acceptor) to produce an excess of holes (or an electron deficiency). At the pn junction, this disparity creates a concentration gradient that causes electrons to diffuse into the P$^+$ layer, and holes to diffuse into the N$^+$ layer. This diffusion results in an opposing electrical potential, referred to as an "internal bias" (or internal electric field) of the pn junction.

The scintillator 12 is typically made of crystalline or ceramic material, including but not limited to cadmium tungstate. Most of the scintillators used in CT x-ray imaging generate light in the visible spectral range, from about 400 nm to about 600 nm. Light in this spectral range is absorbed in a thin layer of silicon (about 1 μm), within the depletion region of the pn junction. More precisely, when incident photons (from the scintillator 12) enter the photodiode 14, electrons in the semiconducting structure become excited. In particular, if the energy of the photons is greater than the bandgap energy of the semiconducting material (typically silicon), electrons will move from the valence band onto the conduction band, and electron-hole pairs are generated.

In FIG. 1, the electron-hole pairs generated by incident optical photons are indicated by reference numeral 24. These electron-hole pairs are separated by drift in the internal electric field of the pn junction. In a region spanning the pn junction and termed the "depletion region" (indicated in FIG. 1 by reference numeral 9), the internal electric field of the pn junction causes any charge carriers therewithin to be rapidly swept to the appropriate layer (the N$^+$ layer 20 for electrons, and P$^+$ layer 18 for holes). The depletion region 9 is an area of neutral charge, since no charge carriers reside therewithin. The charge carriers separate, and move in opposite directions (electrons to the N$^+$ layer, holes to the P$^+$ layer), creating a measurable current that must be collected (for example using a load circuit) before the electron-hole pairs have a chance to recombine.

Some of the incident x-ray photons, indicated in FIG. 1 with reference numerals 2 and 3, interact directly with the silicon photodiode 14 without interacting with the scintillator, creating electron-hole pairs by direct conversion. These directly generated electron-hole pairs are indicated in FIG. 1 by reference numeral 13, and provide unwanted contributions to the detected output signal. In most of the x-ray CT detectors the photodiodes operate in a photovoltaic mode, i.e. at zero external bias, in order to minimize the dark current which appears even when no light is incident on the photodiode. As a result of the zero external bias, the electric field exists only close to the pn junction, and no electric field is present in the intrinsic bulk region. In other applications, photodiodes operate under a reverse bias. As known, the dark current is a leakage current that flows when a reverse bias (or small forward bias) is applied to the photodiode and no light is incident on the photodiode. While initially low, the dark current increases as the device temperature increases.

Accordingly, the charge carriers 13 (created through direct x-ray conversion) move only by diffusion. However, in the high resistivity silicon used in the conventional x-ray detector 10, the diffusion length $L_D = \sqrt{D \cdot \tau}$ of the carriers may be comparable to the thickness of the intrinsic layer 16, and a large fraction of the carriers 13 directly generated by the x-rays are collected. The amount of charge created in the detector due to this process is very different from the amount of charge created when x-ray photons (illustrated in FIG. 1 using reference numeral 1) are absorbed in the scintillator. In the case of a cadmium tungstate scintillator 12 coupled to a silicon photodiode 14, a typical CT detector produces approximately 10 electrons/keV, while the x-rays absorbed in the silicon will produce 276 electrons/keV.

In the past, x-ray shielding has been used to protect the photodiodes from x-rays. Another method of protecting the photodiodes used fiber optic interfaces. Both methods substantially increase the cost of the photodiodes. The method and system of the present invention allows the DQE of an x-ray detector to be increased in a cost-efficient manner, without using costly x-ray shielding and fiber optic interfaces.

Figure 2:
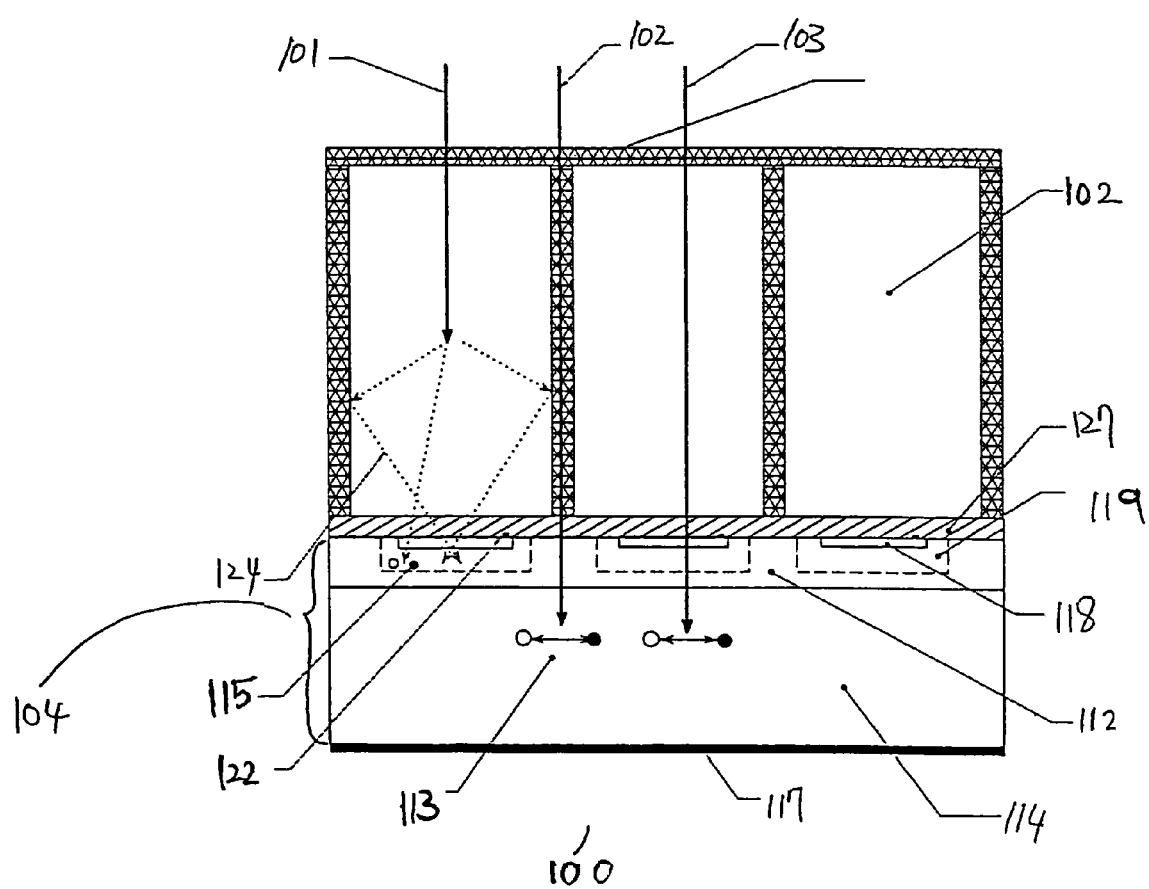
FIG. 2 schematically illustrates an x-ray detector with increased DQE, in accordance with one embodiment.

FIG. 2 schematically illustrates an x-ray detector 100 with increased DQE, in accordance with one embodiment of the present invention. The x-ray detector 100 uses a photodiode that has a low sensitivity to x-ray photons, in order to maximize the DQE of the x-ray detector 100. One way to achieve such lower sensitivity to x-ray photons is to use a silicon p-i-n photodiode constructed on an epitaxial substrate. FIG. 2 illustrates one example of such a detector 100, which includes a scintillator 102, and an epitaxial p-i-n photodiode 104. As known in the art, epitaxial growth is a technique of crystal growth by chemical reaction. Typically, epitaxial growth is used to form, on the surface of a crystal, one or more thin layers of semiconductor material having lattice structures identical to those of the crystal. In the photodiode 104, a thin (approximately 5 μm) N-layer 112 of a lightly doped, high resistivity semiconductor material is epitaxially grown on (by chemical reaction), and supported by, the surface of a heavily doped N$^+$ semiconductor substrate 114. Preferably, the semiconductor material for the epitaxial layer 112 is silicon, and the N$^+$ semiconductor substrate 114 is an N$^+$ silicon substrate.

The N$^+$ silicon substrate 114 is heavily doped, and thus characterized by a relatively low resistivity. The x-ray detector 100 also includes a positively doped, light receiving P$^+$ layer 118, which is adjacent to the epitaxial N-layer 112, so that a pn junction is formed therebetween. The x-ray detector 100 preferably includes electric contacts 117 and 122 attached to the N+ substrate and the P+ layer, respectively. The electric contact 117 attached to the N+ substrate 114 is a metallic cathode. The electric contact 122 attached to the P+ layer 118 is an anode contact. As in the conventional x-ray detector 10 (shown in FIG. 1), an optical interface 127 is provided in order to bond the photodiode 104 to the scintillator 102.

The epitaxial N-layer 112 forms the intrinsic region of the p-i-n photodiode 104. Incident optical photons 124 (created by the interaction of incident x-ray photons with the material forming the scintillator 102) are absorbed in a neutrally charged depletion region 119 that spans the pn junction. When the incident optical photons have an energy greater than the bandgap energy of the epitaxial layer 112, the absorption of these high energy optical photons results in the generation of electron-hole pairs 115 in the depletion region 119, due to excitation of the valence band electrons to the conduction band. The resistivity of the epitaxial layer 112 is sufficiently high to allow the separation by drift (due to the internal bias of the pn junction) of the electron-hole pairs 114 generated in the depletion region 119. In particular, the resistivity of the epitaxial layer 112 is sufficiently high so as to allow the electron-hole pairs 115 generated in the depletion region 119 to separate and move to their respective layers (N+ for the electrons, P+ for the holes), with a rapidity sufficient to substantially prevent any impairment in the collection efficiency of the output electric signal resulting from the motion of the separated electrons and holes.

The N+ silicon substrate 114 preferably has a thickness of about 0.150 mm to about 0.500 mm. Having an N+ substrate 114 with this kind of thickness range improves the mechanical rigidity of the detector 100, and simplifies the handling of the photodiode 104 during manufacture. The resistivity of the N+ silicon substrate 114 is sufficiently low so that when one or more incident x-ray photons penetrate through the scintillator 102 and reach the N+ layer 114 without interacting with the scintillator material, directly converting into electron-hole charge carriers 113, the electron-hole pairs 113 have small lifetimes, and therefore small diffusion lengths $L_D$.

Because the electron-hole pairs 113 created in the heavily doped N+ region 114 have small lifetimes and small diffusion lengths, these x-ray generated charge carriers 113 generally recombine before reaching the pn junction, or before reaching the contacts 117 and 122. On the other hand the sensitivity to the optical photons remains substantially the same as in the conventional x-ray detector 10 depicted in FIG. 1, because light absorption occurs in the depletion region 9 in the high resistivity epitaxial silicon layer. The resistivity of the lightly doped epitaxial layer 112 is sufficiently high to allow the electron-hole pairs 114 created in the depletion region to separate and move apart rapidly to their respective layers, without impairing the collection efficiency of the output signal resulting from the separation and motion of these electron-hole pairs 114.

The performance of the x-ray detector 100 is significantly improved, when compared to the performance of the conventional x-ray detectors 10 known in the art, as can be seen from the following mathematical analysis. The performance of an x-ray detector is usually expressed in terms of normalized pulse spectrum (PS). For the x-ray detector 100 shown in FIG. 2, the PS is the distribution of the charge pulses created in the detector output. Although a single x-ray photon creates a charge pulse, the x-ray detector 100 usually integrates the pulses over a fixed period of time. For monochromatic x-ray photons, the n-th moment $M_n$ of the PS can be expressed as follows:

$$M_n = \int_E S(q) \cdot q^n \, dq \tag{1}$$

where S(q) represents the PS, and q the charge created by the x-ray photon in the detector. The quantum absorption $A_Q$ of the detector can be defined as:

$$A_Q = M_0 \tag{2}$$

The Swank factor (or statistical factor) $A_S$ is expressed as:

$$A_s = \frac{M_1^2}{M_2 \cdot M_0} \tag{3}$$

The Swank factor can be understood as the DQE normalized by the quantum absorption $A_Q$.

The DQE, which ultimately defines the detector performance, is given by:

$$DQE = \frac{M_1^2}{M_2} = A_Q \cdot A_S \tag{4}$$

Equations (1)–(4) show that the performance of the integrating detector depends not only on the probability of the x-ray photon absorption, but also on the PS, or uniformity of the detector response. For the polychromatic x-rays usually used in x-ray CT imaging, the PS distribution can be written in the following form:

$$S(q) = \int_0^{E_{max}} \Psi(E) \cdot K(q, E) \, dE \tag{5}$$

where ψ(E) represents the x-ray spectrum, and K(q,E) represents the probability that the x-ray with energy E will create charge "q" in the detector.

FIG. 3 shows a table (Table 1) which schematically illustrates the improvement in DQE of scintillator/photodiode detector for 1.5 MeV x-ray photons, when an epitaxial photodiode with a 0.005 mm intrinsic epitaxial layer is used. Table 1 contains the results of DQE analysis for a standard (conventional) x-ray detector having a cadmium tungstate scintillator, and 0.145 mm thick silicon photodiode, with 1.5 MeV x-ray photons. The comparison is made with an x-ray detector with the same scintillator, but having a 5 μm thick, epitaxially grown intrinsic layer. The comparative analysis is performed for several values of scintillator thickness, ranging from 2.4 mm to 20.0 mm. The analysis has been performed for illustrative purposes for only one exemplary embodiment of the present invention, and does not limit the x-ray spectrum or the actual detector dimensions covered by other embodiments of the present invention.

While the analysis is provided for a case of monochromatic 1.5 MeV x-ray photons, similar results can be obtained for other x-ray energies, as well as for polychromatic x-rays in MeV energy range used in radiation therapy, and in cargo security inspections. In the present analysis, the PS is the signal output distribution due to the x-ray energy deposition in various parts of the detector: scintillator, and photodiode. The distribution of scintillator pulses due to nonuniformity of the scintillator material, or light collection, is not taken into account. In other words, the analysis below estimates solely the influence of the direct conversion of x-rays in the photodiode.

The 0.145 mm thickness of the photodiode, shown in the example provided in Table 1, is in fact the effective thickness of the 0.300 mm photodiode with respect to the charge collection. In other words, 50% collection efficiency is used in the comparative analysis shown in Table 1. Greater collection efficiency can exist in other zero bias photodetectors, or in fully depleted photodiodes with reverse bias. Therefore the effects of direct conversion of the x-ray in the photodiode can be even greater than in the example provided in Table 1, which does not represent the worst case scenario.

The x-ray photons incident to the detector in FIG. 1 may interact with the scintillator 1, or with the photodiode 3. The probability of interactions is determined by the attenuation coefficients of the scintillator material, and by the photodiode material, usually silicon. The output charge created in both cases is different: 10 el/keV, and 276 el/keV, respectively. The former is a result of an actual measurement, and the latter is derived from well known value of the ionization energy in silicon at room temperature $\epsilon$=3.62 eV. This nonuniformity of the pulse height distribution reduces the Swank factor, and the DQE of the x-ray detector. As a result of the direct conversion of x-rays in the photodiode, the DQE of the detector is significantly smaller than the quantum absorption value, which is the measure of x-ray absorption in the scintillator. For example, the quantum absorption for 10.0 mm thick CWO scintillator is 0.422, but the DQE is approximately two times smaller 0.212. The reduction of the DQE can be in fact even greater in the case of multichannel detectors, with interchannel gaps. The interchannel gaps are usually filled with an optical reflector, and are highly transmissive to x-rays as can be seen for example in ray 2 of FIG. 1.

Table 1 presents the improvement in DQE for x-rays of 1.5 MeV energy range, when the detector is made with an epitaxial photodiode having a 5 μm thick intrinsic layer. One can see that the DQE of the detector is significantly improved, for the same thickness of the scintillator. For example, the DQE of a detector with 10 mm thick scintillator is increased from 0.212 to 0.407, i.e. is almost doubled. In general, using high resistivity epitaxially grown silicon on a low resistivity silicon bulk wafer increases the DQE for x-ray detectors in the 1 MeV to 6 MeV x-ray energy range, such as used for radiation therapy and security cargo inspections. Table 1 also shows that the improved x-ray detector (with an epitaxial photodiode) can achieve the same DQE as a conventional x-ray detector (with no epitaxial photodiode) using a smaller amount of scintillator material, and hence at a reduced cost.

The improvement in DQE depends on a number of factors, including: the dimensions of the detector, x-ray spectrum, scintillator absorption, light yield, and photodiode properties. In a typical medical CT detector, designed for 120–140 kVp x-rays, the interchannel spaces between the crystal elements are filled with an optical reflector, which does not provide x-ray protection to the underlying photodiode. Blocking the crystal gaps with attenuating metal material increases the cost of the CT detectors. For medical multi-slice x-ray CT detectors (for which the x-ray energy range is typically in the range of about 120 kVp to about 140 kVp), Table 1 shows that manufacturing these detectors with epitaxial silicon photodiodes results in a DQE that is about 10% to 30% higher DQE compared with the standard photodiodes. The epitaxial photodiode provide a solution to the problem of reducing x-ray detector noise caused by the interaction of x-rays with the photodiode, which is more economical and easier to manufacture, compared to blocking the x-rays with additional attenuating material.

While the invention has been particularly shown and described with reference to specific preferred embodiments, it should be understood by those skilled in the art that various changes in form and detail may be made therein without departing from the spirit and scope of the invention. It is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. An x-ray detector comprising:
   a. at least one scintillator configured to convert incident x-ray photons into optical photons; and
   b. at least one p-i-n epitaxial photodiode coupled to the scintillator for detecting optical photons and converting the detected optical photons into electric charge pulses, the epitaxial photodiode including:
      i) a negatively doped $N^+$ type semiconductor substrate, characterized by a relatively low resistivity;
      ii) an N-type semiconducting layer epitaxially grown on a surface of said $N^+$ semiconductor substrate, said N-type epitaxial layer forming an intrinsic region of said p-i-n diode, said N-type epitaxial layer being characterized by a relatively high resistivity; and
      iii) a positively doped $P^+$ type layer for receiving optical photons, said $P^+$ layer being disposed adjacent said epitaxial N layer so that a pn junction is formed between said $P^+$ type layer and said epitaxial N-layer; and
   c. a processor configured to integrate the charge pulses from the epitaxial photodiode to compute a pulse spectrum, and to compute from the pulse spectrum a DQE of the x-ray detector;
   wherein the DQE of the x-ray detector is at least about 0.4.

2. An x-ray detector in accordance with claim 1, wherein at least some of the incident optical photons from said scintillator have an energy greater than a bandgap energy of the epitaxial N-layer, so that the absorption of said at least some incident optical photons in a depletion region spanning said pn junction results in generation of electron-hole pairs in said depletion region.

3. An x-ray detector in accordance with claim 2, wherein the resistivity of said epitaxial layer is sufficiently high so as to allow the separation by drift of said electron-hole pairs generated in said depletion region.

4. An x-ray detector in accordance with claim 3, wherein the rapidity of said separation is sufficient to substantially prevent an impairment in the collection efficiency of the output electric signal resulting from the motion of the separated electron-hole pairs.

5. An x-ray detector in accordance with claim 1, wherein the resistivity of said $N^+$ substrate is sufficiently low so that when one or more incident x-ray photons pass through the scintillator without interacting with scintillator material and reach said N+ substrate to directly convert into electron-hole charge carriers, the lifetimes and diffusion lengths of said charge carriers are small enough to allow said charge carriers to recombine before reaching said pn junction, whereby the contribution of x-ray generated charge carriers to the electric signal from the x-ray detector is substantially reduced.

6. An x-ray detector in accordance with claim 1, wherein said N+ substrate is relatively heavily doped, compared to said epitaxial N-layer.

7. An x-ray detector in accordance with claim 1, wherein said epitaxial N-layer is relatively lightly doped, compared to said N+ substrate.

8. An x-ray detector in accordance with claim 1, wherein said N+ semiconductor substrate comprises an N+ silicon substrate, and wherein said P+ semiconductor layer comprises a P+ silicon layer.

9. An x-ray detector in accordance with claim 1, wherein said epitaxial N-layer has a thickness of about 5 µm.

10. An x-ray detector in accordance with claim 1, further comprising an optical interface for bonding said scintillator to said photodiode.

11. An x-ray detector in accordance with claim 10, wherein said optical interface comprises epoxy glue.

12. An x-ray detector In accordance with claim 11, wherein said crystal is effective to interact with incident x-ray photons to generate light in a spectral range from about 400 nm to about 600 nm.

13. An x-ray detector in accordance with claim 1, wherein said scintillator comprises a crystal.

14. The x-ray detector of claim 1, wherein the x-ray detector is configured to detect x-rays having energies between about 1 MeV to about 6 MeV, and wherein the scintillator is further configured to convert incident x-ray photons having energies between about 1 MeV to about 6 MeV.

15. An x-ray detector in accordance with claim 14, wherein the pulse spectrum comprises a normalized pulse spectrum representable as S(q), where q is a variable representing charge of the pulses, and wherein the processor is further configured to compute the n-th moment $M_n$ of the pulse spectrum S(q) using a mathematical formula given by $$M_n = \int_E S(q) \cdot q^n \, dq,$$

where n represents an integer, and to compute the DQE using a mathematical formula given by $M_1^2/M_2$.

16. The x-ray detector in accordance with claim 1, wherein the x-rays comprise monochromatic x-rays.

17. An x-ray detector in accordance with claim 16, wherein the pulse spectrum S(q) depends on energies of the polychromatic x-rays, wherein the processor is further configured to compute the pulse spectrum S(q) using a mathematical formula given by $$S(q) = \int_0^{E_{max}} \Psi(E) \cdot K(q, E) \cdot dE,$$

in which parameter E represents energy of the x-rays, constant $E_{max}$ represents a maximum energy of the polychromatic x-rays, $\psi(E)$ represents spectrum of the x-rays, and K(q,E) represents a probability that an x-ray with energy E will create a charge q in the detector.

18. An x-ray detector in accordance with claim 1, wherein the x-rays comprise polychromatic x-rays.

19. An x-ray detector comprising:
   a. a scintillator array for converting incident x-ray photons into optical photons; and
   b. an array of epitaxial photodiodes, coupled to the scintillator array for converting said optical photons into electric charge pulses, each epitaxial photodiode including:
      i) a negatively doped N+ type semiconductor substrate having a relatively low resistivity;
      ii) an N-type layer having a relatively high resistivity, said N-layer being epitaxially grown on a surface of the N+ semiconductor substrate to form a lightly doped intrinsic region of said p-i-n diode;
      iii) a positively doped P+ type light receiving layer adjacent said epitaxial N layer;
      iv) a pn junction formed between said P+ type layer and said epitaxial N-layer; and
   c. at least one processor configured to integrate the charge pulses from the epitaxial photodiodes to compute a pulse spectrum, and to compute from the pulse spectrum a DQE (detective quantum efficiency) of the x-ray detector;
   wherein the DQE is at least about 0.4.

* * * * *